United States Patent
VanBuskirk et al.

[11] Patent Number: 6,075,534
[45] Date of Patent: Jun. 13, 2000

[54] MULTIPLE FUNCTION GRAPHICAL USER INTERFACE MINIBAR FOR SPEECH RECOGNITION

[75] Inventors: Ronald VanBuskirk, Indiantown; James R. Lewis, Delray Beach, both of Fla.

[73] Assignee: International Business Machines Corporation, Armonk, N.Y.

[21] Appl. No.: 09/048,519

[22] Filed: Mar. 26, 1998

[51] Int. Cl.[7] ............................... G10L 9/06; G06F 3/14
[52] U.S. Cl. ..................... 345/348; 345/978; 704/275
[58] Field of Search ..................... 345/343, 326, 345/333, 334, 335, 336, 338, 339, 340, 347, 348, 349, 352, 978, 357; 704/235, 270, 275, 231

[56] References Cited

U.S. PATENT DOCUMENTS

| | | | |
|---|---|---|---|
| 5,133,011 | 7/1992 | McKiel, Jr. ............................... | 704/276 |
| 5,386,494 | 1/1995 | White ....................................... | 704/275 |
| 5,818,423 | 10/1998 | Pugliese et al. ......................... | 345/157 |
| 5,819,225 | 10/1998 | Eastwood et al. ....................... | 704/275 |
| 5,864,815 | 1/1999 | Rozak et al. ............................. | 704/275 |
| 5,864,819 | 1/1999 | De Armas et al. ...................... | 704/275 |
| 5,873,064 | 2/1999 | De Armas et al. ...................... | 704/275 |
| 5,890,122 | 3/1999 | Van Kleeck et al. ................... | 704/275 |
| 5,903,870 | 5/1999 | Kaufman .................................. | 704/275 |
| 5,920,841 | 7/1999 | Schottmuller et al. ................. | 704/275 |

*Primary Examiner*—Matthew M. Kim
*Assistant Examiner*—Crescelle N. dela Torre
*Attorney, Agent, or Firm*—Quarles & Brady LLP

[57] ABSTRACT

A multiple function graphical user interface for a speech recognition application adapted for generation by a computer programmed with a routine set of instructions, the interface comprising: an activatable icon defining an elongated screen display area, the icon having separately controllable foreground and background displays substantially coextensive with the display area; the background display being substantially fully changeable in response to user speech into a microphone having at least two states; text being displayable in the foreground display across substantially all of the display area; and, activation of the icon invoking a function related to the speech recognition application. A border can be selectively displayed around the elongated screen display area for indicating whether the speech application is in a navigation mode or a dictation mode.

31 Claims, 3 Drawing Sheets

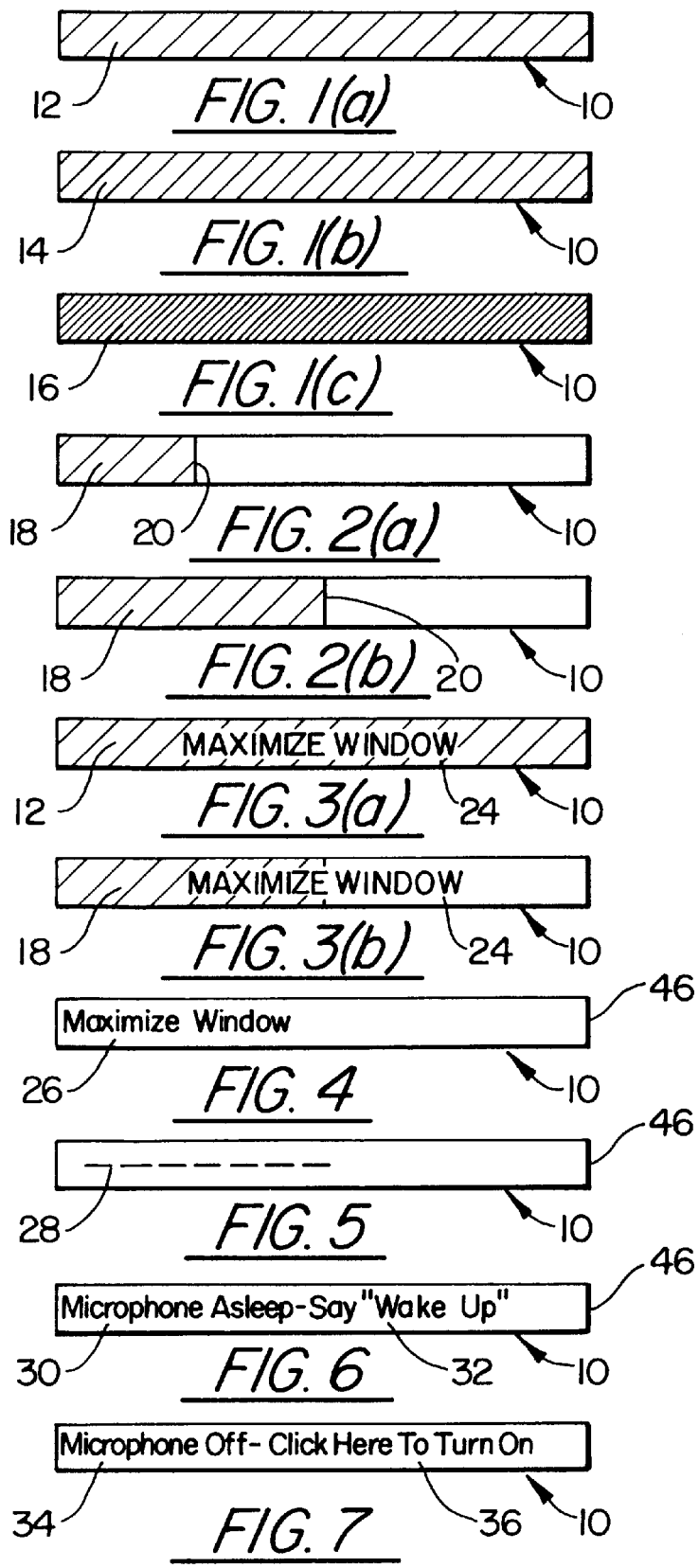

MULTIPLE FUNCTION GRAPHICAL USER INTERFACE MINIBAR FOR SPEECH RECOGNITION

BACKGROUND OF THE INVENTION

1. Field of the Invention

This invention relates generally to the field of graphical user interfaces for speech applications, and in particular, to a multiple function graphical user interface for speech recognition which utilizes a minimum of screen space.

2. Description of Related Art

Presently, as developers add speech functions to computer graphical user interfaces, the speech function requires its own graphical interface. Speech users naturally want to minimize the amount of screen space occupied by the graphical user interface for speech recognition because the user can control the interface by voice. Generally speaking, the smaller the graphical user interface for speech recognition, the better.

Integrating speech recognition into a visually-based graphical user interface can be difficult. The difficulty stems from the fact that because the graphical user interface is visually-based, every encroachment upon this limited space reduces the free space for the user. However, the present level of speech recognition technology requires that the user be able to review several kinds of visual feedback. Therefore the challenge posed for developing an improved graphical speech interface is to present the minimal information required in the smallest space possible.

Current technology requires that the user have available the following information: 1) the state of the microphone/speech system, that is on, off or asleep; 2) the last recognized phrase; 3) whether the application has speech focus; 4) feedback that the application is working; and, 5) status messages from the speech system. In addition the user must also have, at a minimum, the ability to control the microphone state with the mouse or other pointing tool, in case speech is not functioning. At best the user must have a mouse activatable equivalent for every speech command, because speech is not a deterministic input system.

Combining all of these functions into a truly minimal space is an elegant solution to a difficult problem. Various existing systems combine functionality in floating speech bars. Specific examples are instructive.

Existing systems combine their functionality in floating speech bars. The Dragon systems is shown in FIGS. 12(a) and 12(b). They combine the microphone and VU meter into one button, as shown in the upper right hand corner of FIG. 12(b).

In VOICE from Kurzweil, as shown in FIG. 13, all of the functions are combined on a tool bar and display the recognized text in a floating tool window.

The tool bars from VoiceType Connection and Voice Center, both available from IBM, are as shown in FIGS. 14 and 15 respectively.

None of the tool bar arrangements described above can truly be described as minimal, in terms of the necessary display area.

SUMMARY OF THE INVENTION

A minimal graphical user interface for speech recognition, also referred to herein as a minibar, in accordance with the inventive arrangements, combines the recognized text field, the on/off button, and the volume meter into one graphical user interface component.

A computer programmed with a routine set of instructions stored in a physical medium, for generating a multiple function graphical user interface for a speech recognition application in accordance with an inventive arrangement, comprises: means for displaying an activatable icon defining an elongated screen display area, the icon having separately controllable foreground and background displays substantially coextensive with the display area; means for changing substantially all of the background display in response to user speech into a microphone having at least two states; means for displaying text in the foreground display across substantially all of the display area; and, means responsive to activation of the icon for invoking a function related to the speech recognition application.

The changing means changes can advantageously change the background display by one of the following: changing from a first color to at least a second color responsive to variations of the volume of the user speech; generating a color ribbon having one fixed edge and one movable edge responsive to variations of the volume of the user speech; and, changing between lighter and darker shades of at least one color responsive to variations of the volume of the user speech.

The text displaying means, in conjunction with each embodiment of the changing means, can selectively display one or more of the following: each last recognized phrase of the user speech; status messages from the speech application; and, prompts for changing the states of the microphone.

In conjunction with each of the embodiments of the changing means, the function invoking means can display: a menu list of secondary speech functions responsive to activation of a pointing tool button when the icon is displayed; and, further icons for additional dictation functions can be displayed when dictation is active.

In conjunction with each of the embodiments noted above, the computer advantageously further comprises means for selectively generating a border around the elongated screen display area and around the further icons for indicating whether the speech application is in a navigation mode or a dictation mode.

A multiple function graphical user interface for a speech recognition application adapted for generation by a computer programmed with a routine set of instructions, in accordance with another inventive arrangement, comprises: an activatable icon defining an elongated screen display area, the icon having separately controllable foreground and background displays substantially coextensive with the display area; the background display being substantially fully changeable in response to user speech into a microphone having at least two states; text being displayable in the foreground display across substantially all of the display area; and, activation of the icon invoking a function related to the speech recognition application.

The background display can be advantageously changeable responsive to variations of the volume of the user speech in at least one of: from a first color to at least a second color; as a color ribbon having at least one movable edge; and, between lighter and darker shades of at least one color.

The text can advantageously includes at least one of: each last recognized phrase of the user speech; status messages from the speech application; and, prompts for changing the states of the microphone.

The invoked functions can advantageously include at least one of: displaying a menu list of secondary speech functions; and, displaying further icons for additional dictation functions.

The interface can advantageously further comprise a border selectively displayed around the elongated screen display area and around the further icons for indicating whether the speech application is in a navigation mode or a dictation mode.

BRIEF DESCRIPTION OF THE DRAWINGS

FIGS. 1(a), 1(b) and 1(c) show a first embodiment of a minimal graphical user interface tool bar in accordance with the inventive arrangements.

FIGS. 2(a) and 2(b) show a second embodiment of a minimal graphical user interface tool bar in accordance with the inventive arrangements.

FIGS. 3(a) and 3(b) show multiple functionality based on the first and second embodiments respectively.

FIG. 4 shows a graphical user interface tool bar, as in either of the first and second embodiments, in a resting state and displaying the last command.

FIG. 5 shows a graphical user interface tool bar, as in either of the first and second embodiments, in a resting state after a timeout function erases the last command shown in FIG. 4.

FIG. 6 shows a graphical user interface tool bar, as in either of the first and second embodiments, in a resting state when the microphone is asleep.

FIG. 7 shows a graphical user interface tool bar, as in either of the first and second embodiments, in a resting state when the microphone is turned off.

DETAILED DESCRIPTION OF THE PREFERRED EMBODIMENTS

Figure 8:
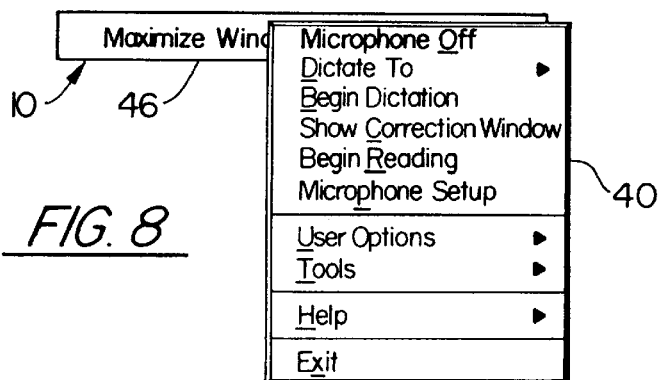
FIG. 8 shows a graphical user interface tool bar, as in either of the first and second embodiments, with an appended pull down menu.

The inventive arrangements embodied in a multiple function graphical user interface supply the required information in the smallest space possible. All of the following information can be provided.

The on, off or asleep state of the speech system is displayed. If the system is off, the preferred nature of the display is text, which tends to be more understandable than an icon.

The entire length of the minibar, which can change during the display and/or be user adjustable in length, can be devoted to displaying the last recognized phrase or command. Having extra room for the text field is particularly important for European, Middle Eastern and African languages.

Whether the application has speech focus is easily indicated with the large VU meter changing colors in the background, thus increasing the visibility of the active speech application. A large volume meter changing colors also alerts the user that the speech application is running.

Finally, being able to devote the entire length of the minibar to text also facilitates the display of status messages from the speech application.

A minimal graphical user interface for speech recognition combines the recognized text field, the on/off button, and the volume (VU) meter into one graphical user interface component. Part of the trick in generating a multiple function display in a single component advantageously relies on controlling the color or colors of the background of the component to represent the volume meter, which is difficult to show in black and white drawings.

FIG. 1(a) shows a minibar 10 which is arbitrarily cross hatched to represent a light color 12, for example yellow. FIG. 1(b) shows the minibar 10 arbitrarily cross hatched with a denser pattern of lines to represent a darker color 14, for example green. FIG. 1(c) shows the minibar 10 arbitrarily cross hatched with a still denser pattern of lines to represent a still darker color 16, for example red. The sequence of the yellow, green and red colors can be easily perceived as representing volume level of dictated speech. Alternatively, the progression of cross hatching density in FIGS. 1(a), 1(b) and 1(c) can also represent lighter and darker shades of the same color, which can also be easily perceived as representing the volume level of dictated speech.

An alternative background color display is shown in FIGS. 2(a) and 2(b), in which the minibar 10 is arbitrarily cross hatched with a pattern of lines to illustrate displaying volume as a moving ribbon or thermometer 18, wherein movement of the right edge 20 of the ribbon, for example, is easily perceived as representing the volume level of dictated speech.

The minibar 10 can display the last dictated phrase or command 24, as shown in FIGS. 3(a) and 3(b), which differ from one another in the manner in which the background color display is implemented.

When no dictation has been received after a predetermined timeout or delay, the last phrase or command is erased. This condition can be displayed as shown in FIG. 5 by using a symbol 28 such as a dashed line.

When the microphone is asleep, and must be awakened for further dictation, the minibar 10 can appear as shown in FIG. 6. A status message 30 indicates the microphone is asleep and a prompt 32 is the proper command to wake up the microphone.

When the microphone is turned off, and must be turned on for further dictation, the minibar 10 can appear as shown in FIG. 7. A status message 34 indicates the microphone is turned off and a prompt 36 is the proper command to turn on the microphone.

Figure 9:
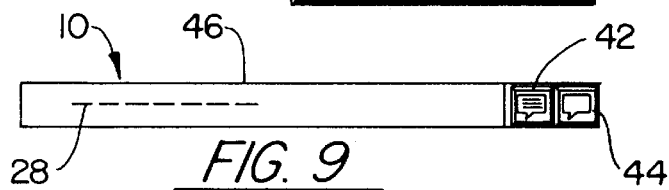
FIG. 9 shows a graphical user interface tool bar, as in either of the first and second embodiments, in a navigation mode and with additional function buttons.
Figure 10:
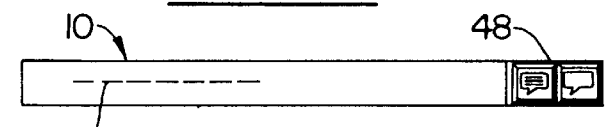
FIG. 10 shows a graphical user interface tool bar, as in either of the first and second embodiments, in a dictation mode and with additional function buttons.
Figure 12A:
FIGS. 12(a), 12(b) and 13–15 illustrate various speech tool bar arrangements known in the prior art.
Figure 12B:
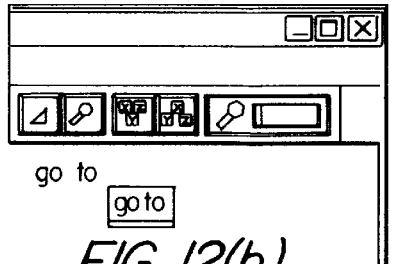
Figure 13:
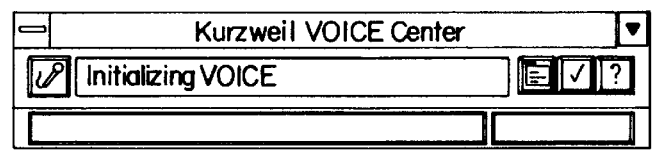
Figure 14:
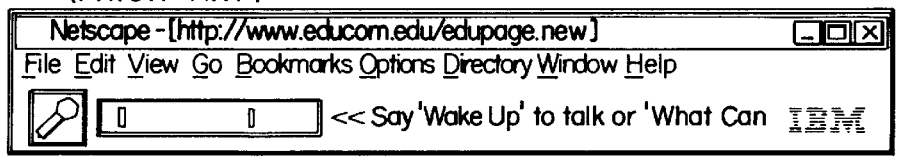
Figure 15:
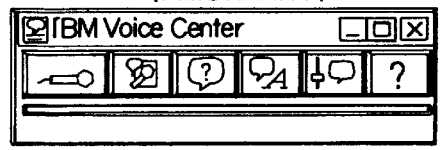

The minibar 10 can be controlled, for example, by a mouse. Clicking with the left mouse button on the minibar can turn the minibar on and off. Clicking with the right mouse button can bring up a display of a list of secondary speech functions, for example a menu 40 as shown in FIG. 8. When dictation is active in an application, additional dictation buttons 42 and 44, for example for starting and stopping dictation respectively, will become visible as shown in FIGS. 9 and 10. The minibar in FIG. 9 is in a navigation mode, indicated by a border 46, preferably in a contrasting color, around the basic minibar. Navigation commands, also referred to as control commands, will appear in place of the dashed line 28 as they are recognized. The minibar in FIG. 10 is in a dictation mode, indicated by the border 48 around the start and stop dictation buttons 42 and 44. The border 46 is also shown in FIGS. 4, 5, 6 and 8, as the dictation application is in the navigation mode. The borders, which can also be shown in different colors to represent status conditions, provide yet another function in a minimal screen area. A double left-click can be used to invoke a fast-path function, for example launching an audio adjustment application.

The minibar can be embedded into the Windows95 task bar; can be embedded into a tool bar in the application; can be embedded into the title bar of an application window; or, can be used as a floating window.

Figure 11:
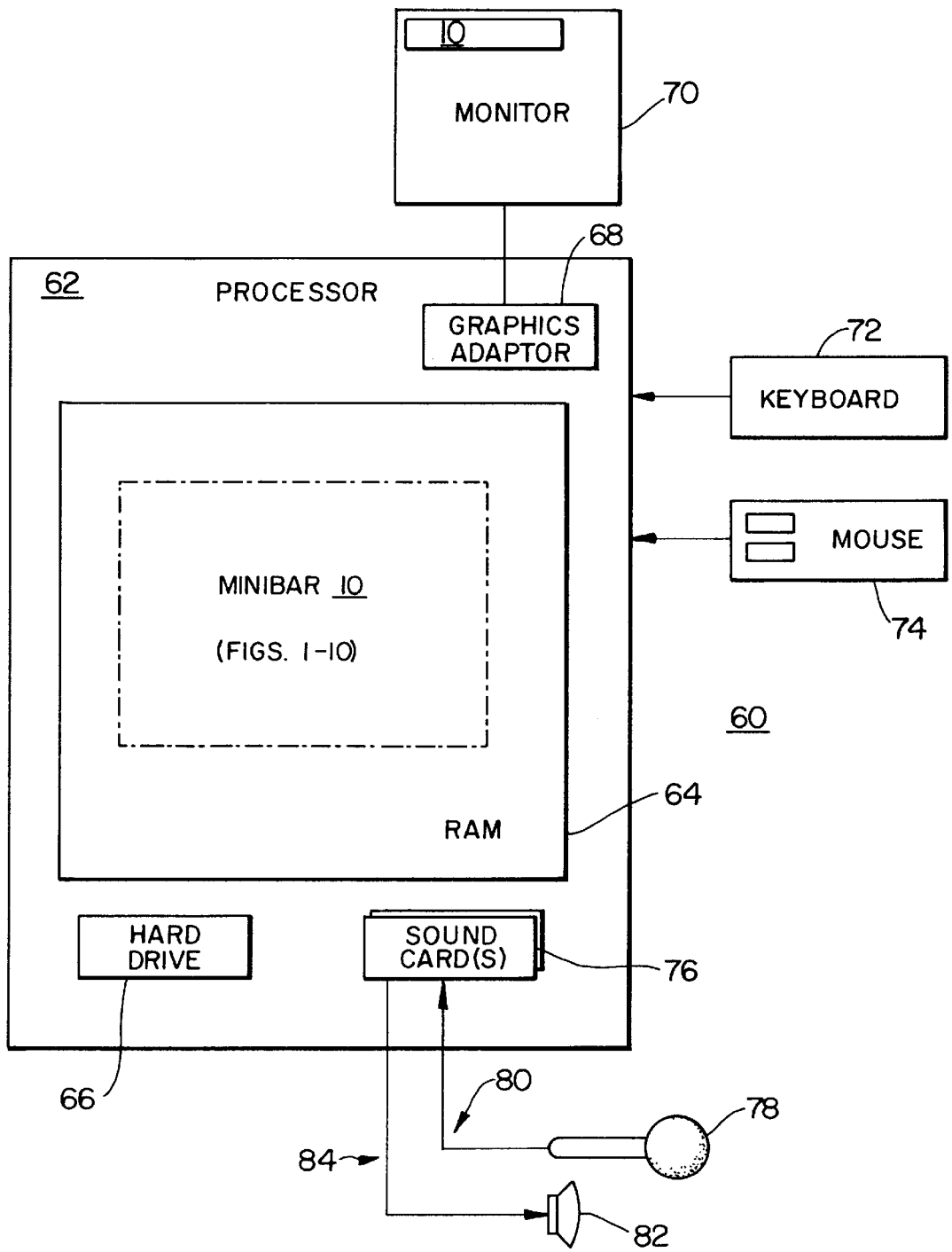
FIG. 11 is a block diagram of a computer programmed with a routine set of instructions for generating a multiple function graphical user interface in accordance with the inventive arrangements, and as shown in FIGS. 1–10.

A computer system 60 is shown in block diagram form in FIG. 11. The computer system is programmed with a set of instructions stored in a physical medium, for example a hard drive 66 and/or a random access memory (RAM) 64 of a central processor 62, for generating the minibar 10 shown in FIGS. 1–10. The computer has an audio interface 80, 84 between one or more sound or audio cards 76 in the computer apparatus and each of a microphone 78 and a speaker 82. Microphone 78 is intended to represent, for example, a headset microphone, a desktop microphone, a monitor microphone and a hand held microphone. Speaker 82 is intended to represent, for example, one or more internal speakers, one or more external speakers, one or more monitor speakers or a headset speaker. The computer system 60 has a graphics adapter 68 that generates the GUI displays explained above and shown in FIGS. 1–10. The computer system further comprises a monitor 70, a keyboard 72 and a mouse 74. The dashed line box shown in random access memory 64 represents a programmed routine of instructions for generating the graphical user interface minibar, in accordance with the inventive arrangements. The instructions are stored in a physical medium embodied by hard drive 66 and loaded into another physical medium embodied by random access memory 64. The programmed routine of instructions implements the steps of generating the minibar 10 as shown and described herein.

This method of displaying the basic speech information to the user minimizes the required screen space. The interface taught herein provides information a user requires as long as the chance of speech misrecognitions can occur, as long as there is a detectable delay in speech recognition, as long as the system has to provide the user with messages, and as long as the multiple windows paradigm is used on computers. This will continue to be the environment of speech applications for the foreseeable future.

What is claimed is:

1. A computer programmed with a routine set of instructions stored in a physical medium for generating a multiple function graphical user interface for a speech recognition application, comprising:

means for displaying an activatable icon having a border defining an elongated screen display area within said border, said icon having separately controllable foreground and background displays substantially coextensive with said display area, said foreground display superimposed on said background display;

means for changing substantially all of said background display in response to variations of the volume of user speech into a microphone having at least two states;

means for displaying text in said foreground display across substantially all of said display area; and, means responsive to activation of said activatable icon for invoking a function related to said speech recognition application.

2. The computer of claim 1, wherein said changing means changes said background display progressively from a first color to at least a second color responsive to variations of the volume of said user speech.

3. The computer of claim 1, wherein said changing means changes said background by generating a color ribbon having one fixed edge and one movable edge responsive to variations of the volume of said user speech.

4. The computer of claim 1, wherein said changing means changes said background display between lighter and darker shades of at least one color responsive to variations of the volume of said user speech.

5. The computer of claim 1, wherein said text displaying means displays each last recognized phrase of said user speech.

6. The computer of claim 1, wherein said text displaying means displays status messages from said speech application.

7. The computer of claim 1, wherein said text displaying means displays prompts for changing said states of said microphone.

8. The computer of claim 1, wherein said text displaying means selectively displays:

each last recognized phrase of said user speech;

status messages from said speech application; and, prompts for changing said states of said microphone.

9. The computer of claim 2, wherein said text displaying means selectively displays:

each last recognized phrase of said user speech;

status messages from said speech application; and, prompts for changing said states of said microphone.

10. The computer of claim 3, wherein said text displaying means selectively displays:

each last recognized phrase of said user speech;

status messages from said speech application; and, prompts for changing said states of said microphone.

11. The computer of claim 4, wherein said text displaying means selectively displays:

each last recognized phrase of said user speech;

status messages from said speech application; and, prompts for changing said states of said microphone.

12. The computer of claim 1, wherein said invoked function displays a menu list of secondary speech functions.

13. The computer of claim 12, wherein said invoked function displays further icons for additional dictation functions.

14. The computer of claim 1, wherein said invoked function displays further icons for additional dictation functions.

15. The computer of claim 13, wherein said changing means changes said background display progressively from a first color to at least a second color responsive to variations of the volume of said user speech.

16. The computer of claim 13, wherein said changing means changes said background by generating a color ribbon having one fixed edge and one movable edge responsive to variations of the volume of said user speech.

17. The computer of claim 13, wherein said changing means changes said background display between lighter and darker shades of at least one color responsive to variations of the volume of said user speech.

18. The computer of claim 13, wherein said text displaying means selectively displays:

each last recognized phrase of said user speech;

status messages from said speech application; and, prompts for changing said states of said microphone.

19. The computer of claim 15, wherein said text displaying means selectively displays:
- each last recognized phrase of said user speech;
- status messages from said speech application; and,
- prompts for changing said states of said microphone.

20. The computer of claim 16, wherein said text displaying means selectively displays:
- each last recognized phrase of said user speech;
- status messages from said speech application; and,
- prompts for changing said states of said microphone.

21. The computer of claim 17, wherein said text displaying means selectively displays:
- each last recognized phrase of said user speech;
- status messages from said speech application; and,
- prompts for changing said states of said microphone.

22. The computer of claim 1, further comprising means for selectively generating a border around said elongated screen display area for indicating whether said speech application is in a navigation mode or a dictation mode.

23. The computer of claim 8, further comprising means for selectively generating a border around said elongated screen display area for indicating whether said speech application is in a navigation mode or a dictation mode.

24. The computer of claim 13, further comprising means for selectively generating a border around said elongated screen display area and around said further icons for indicating whether said speech application is in a navigation mode or a dictation mode.

25. The computer of claim 18, further comprising means for selectively generating a border around said elongated screen display area and around said further icons for indicating whether said speech application is in a navigation mode or a dictation mode.

26. A multiple function graphical user interface for a speech recognition application adapted for generation by a computer programmed with a routine set of instructions, said interface comprising:
- an activatable icon having a border defining an elongated screen display area within said border, said icon having separately controllable foreground and background displays substantially coextensive with said display area, said foreground display superimposed on said background display;
- said background display being substantially fully changeable in response to variations of the volume of user speech into a microphone having at least two states;
- text being displayable in said foreground display across substantially all of said display area; and,
- activation of said activatable icon invoking a function related to said speech recognition application.

27. The interface of claim 26, wherein said background display is changeable responsive to variations of the volume of said user speech in at least one of:
- progressively from a first color to at least a second color;
- as a color ribbon having at least one movable edge; and,
- between lighter and darker shades of at least one color.

28. The interface of claim 26, wherein said text includes at least one of:
- each last recognized phrase of said user speech;
- status messages from said speech application; and,
- prompts for changing said states of said microphone.

29. The interface of claim 26, wherein said invoked functions include at least one of:
- displaying a menu list of secondary speech functions; and,
- displaying further icons for additional dictation functions.

30. The interface of claim 29, further comprising a border selectively displayed around said elongated screen display area and around said further icons for indicating whether said speech application is in a navigation mode or a dictation mode.

31. The interface of claim 26, further comprising a border selectively displayed around said elongated screen display area for indicating whether said speech application is in a navigation mode or a dictation mode.

* * * * *